(12) United States Patent
Fujita et al.

(10) Patent No.: US 12,013,805 B2
(45) Date of Patent: Jun. 18, 2024

(54) COMMUNICATION CONTROL APPARATUS AND COMMUNICATION METHOD

(71) Applicant: DENSO TEN Limited, Hyogo (JP)

(72) Inventors: Kazuki Fujita, Kobe (JP); Katsutomo Sasakura, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 18/081,059

(22) Filed: Dec. 14, 2022

(65) Prior Publication Data

US 2023/0305987 A1    Sep. 28, 2023

(30) Foreign Application Priority Data

Mar. 28, 2022   (JP) .................................. 2022-052576

(51) Int. Cl.
*G06F 13/42*        (2006.01)
(52) U.S. Cl.
CPC ................................ *G06F 13/4282* (2013.01)
(58) Field of Classification Search
CPC .................................................. G06F 13/4282
See application file for complete search history.

(56) References Cited

U.S. PATENT DOCUMENTS

| 5,590,306 A | * | 12/1996 | Watanabe | ........ G06Q 20/35765 |
| | | | | 711/100 |
| 2002/0174283 A1 | * | 11/2002 | Lin | ..................... G06F 11/1441 |
| | | | | 714/E11.138 |
| 2016/0070496 A1 | * | 3/2016 | Cohen | ................... G06F 3/0644 |
| | | | | 711/103 |

FOREIGN PATENT DOCUMENTS

JP             2021-120792 A        8/2021

* cited by examiner

*Primary Examiner* — Henry Tsai
*Assistant Examiner* — John B Roche
(74) *Attorney, Agent, or Firm* — Oliff PLC

(57) ABSTRACT

An apparatus includes a communication apparatus and a second controller. The communication apparatus includes a memory to store a program, a reception buffer to save reception data, a transfer destination buffer to receive transfer reception data and a first controller to erase the reception data when the reception data are transferred to the transfer destination buffer, and execute a hardware reset of erasing the program and executing an initialization process upon detecting abnormality. The second controller checks, after transmitting the data to the communication apparatus, whether the transmitted data are saved in the reception buffer after an elapse of a predetermined period of time shorter than a period of time till the hardware reset upon occurrence of abnormality in transferring the data. The second controller causes the communication apparatus to execute a software reset when at least some proportion of the transmitted data are saved in the reception buffer.

15 Claims, 9 Drawing Sheets

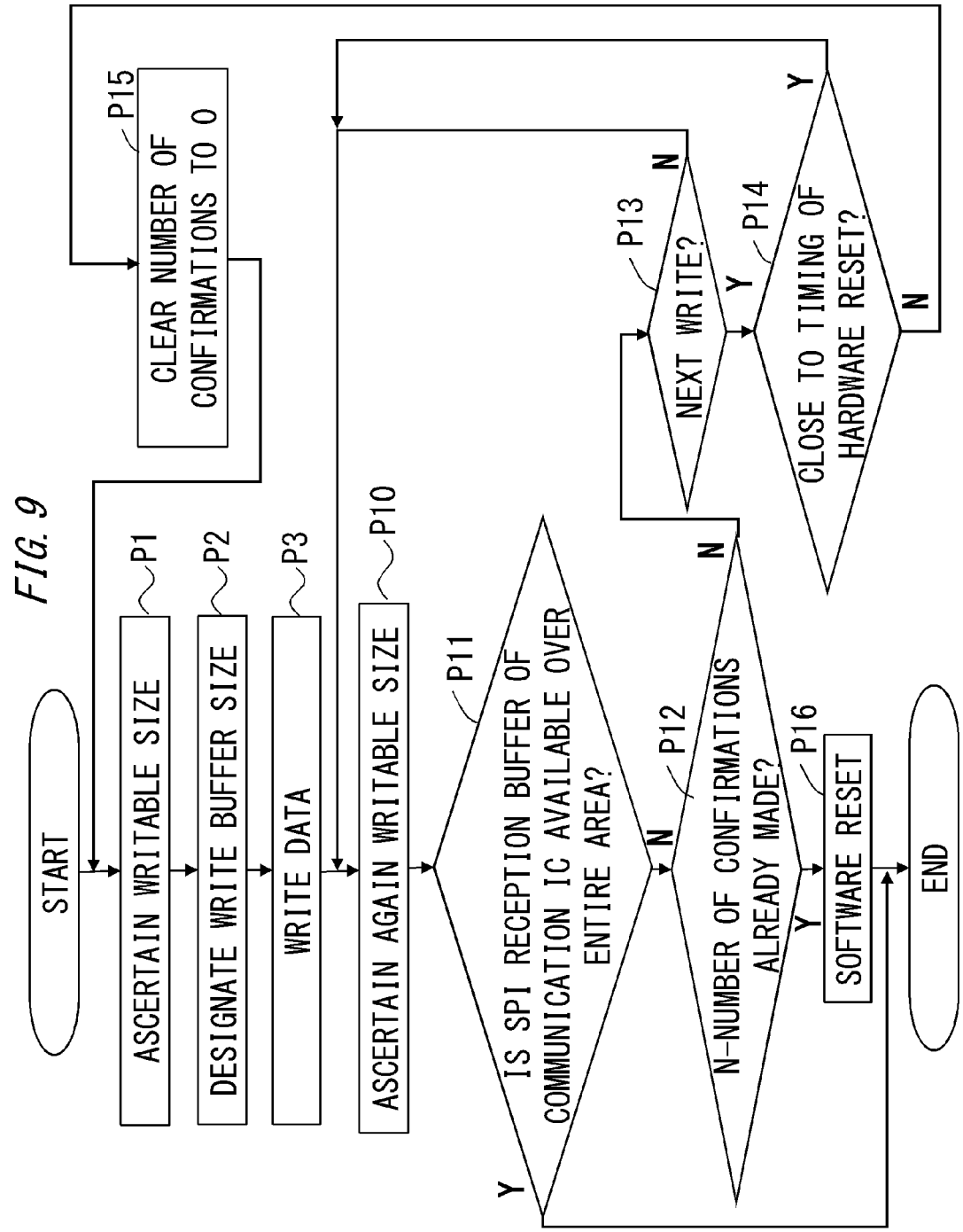

COMMUNICATION CONTROL APPARATUS AND COMMUNICATION METHOD

CROSS REFERENCE TO THE RELATED APPLICATION

This application claims the benefit of Japanese Patent Application No. 2022-52576, filed on Mar. 28, 2022, which is hereby incorporated by reference herein in its entirety.

BACKGROUND

Technical Field

The present disclosure pertains to a communication control apparatus and a communication method.

Description of the Related Art

A system of an electronic device and equivalents is equipped with a variety of Integrated Circuits (ICs) to perform mutual communications between or among the multiple ICs, thus attaining functions of the system. There is a case of not mounting a mechanism for detecting a communication error in the communications between the ICs, depending on specifications of the system or communication environments. This is because of, e.g., a case of giving a priority to executing a data transfer easily between the ICs or a case in which an occurrence of the communication error is hard to assume originally.

[Patent Document 1] Japanese Patent Laid-Open Publication No. 2021-120792

SUMMARY

There exists, however, a difficult case to handle a communication error actually occurring in a system not mounted with the mechanism for detecting the communication error. However, a communication error detection mechanism to be mounted is configured easy to make erroneous detection, in which case it is a point to handle the error. An aspect of the embodiment of the disclosure resides in handling the communication error by restraining the erroneous detection of the communication error in a system not incorporating a mechanism of detecting the communication error.

One aspect of an embodiment of the disclosure is illustrated by a communication control apparatus. The communication control apparatus includes a communication apparatus and a second controller. The communication apparatus includes a memory configured to store a program, a reception buffer configured to save reception data, a transfer destination buffer configured to receive transfer reception data transferred from the reception buffer and a first controller configured to erase the reception data from the reception buffer when the reception data are transferred to the transfer destination buffer from the reception buffer, and to execute a hardware reset of erasing the program and executing an initialization process upon detecting abnormality. The second controller transmits data or a command to the communication apparatus. The second controller checks, after transmitting the data to the communication apparatus, whether the transmitted data are saved in the reception buffer after an elapse of a predetermined period of time shorter than a period of time till executing the hardware reset upon occurrence of the abnormality in transferring the data. And the second controller transmits a command for getting a software reset executed to execute another initialization process without erasing the program to the communication apparatus upon at least some proportion of the transmitted data are saved in the reception buffer.

The communication control apparatus may handle communication errors while suppressing erroneous detection of communication errors.

BRIEF DESCRIPTION OF THE DRAWINGS

FIG. 9 is a flowchart illustrating the processes of the host MC according to the embodiment 3.

DETAILED DESCRIPTION

A communication control apparatus and a communication method according to one embodiment will hereinafter be described with reference to drawings. The communication control apparatus includes a plurality of ICs exemplified by microcomputers or microcontrollers (both of which will hereinafter be simply referred to as "MCs"), and image processing ICs or ICs for communications with the outside. At least some of these ICs do not have any mechanisms to detect errors in mutual communications in the embodiment.

Figure 1:
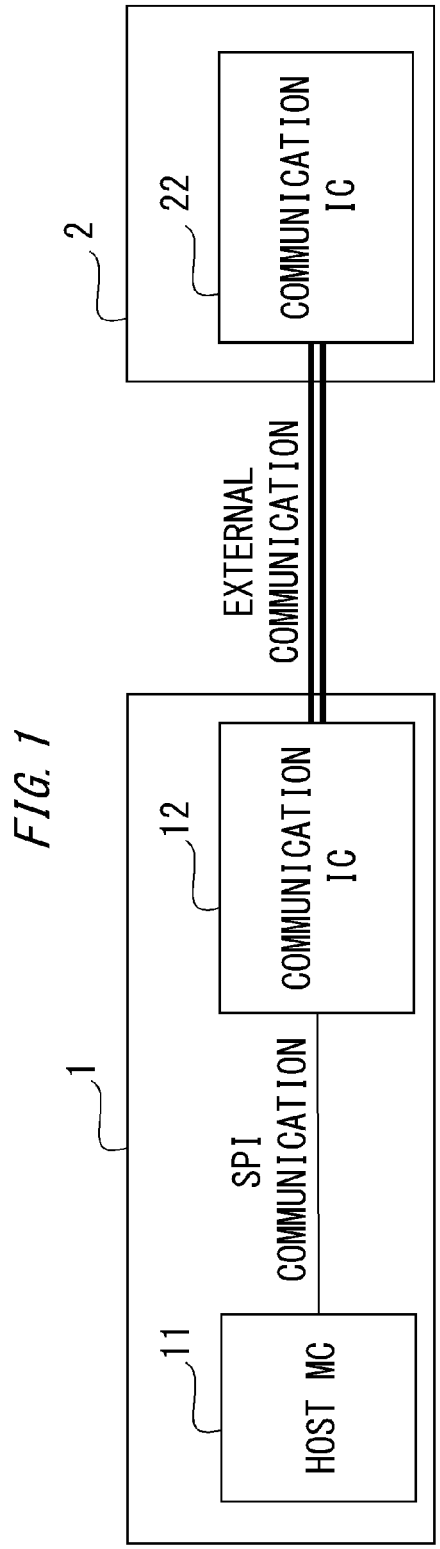
FIG. 1 is a diagram illustrating a configuration of a communication control apparatus according to an embodiment.

FIG. 1 illustrates a configuration of a communication control apparatus 1 according to the embodiment. Note that FIG. 1 also depicts an operation target apparatus 2 connectible to the communication control apparatus 1. The communication control apparatus 1 is exemplified by a charging system mounted in an Electric Vehicle (EV). The operation target apparatus 2 is exemplified by a charging equipment of a charging stand. Accordingly, the communication control apparatus 1 includes a communication IC 12 that performs external communications with the charging stand and equivalents together with a host MC 11. On the other hand, the operation target apparatus 2 includes a communication IC 22 that performs the communications with the communication control apparatus 1 defined as the in-vehicle charging system. The communication ICs 12, 22 are the ICs to perform the external communications by establishing a connection between the EV and the charging stand. Each of the communication ICs 12, 22 internally includes a Central Processing Unit (CPU), a memory, an Input/Output (I/O) interface, a communication interface and equivalents, which are isolated from an electric power line.

Figure 2:
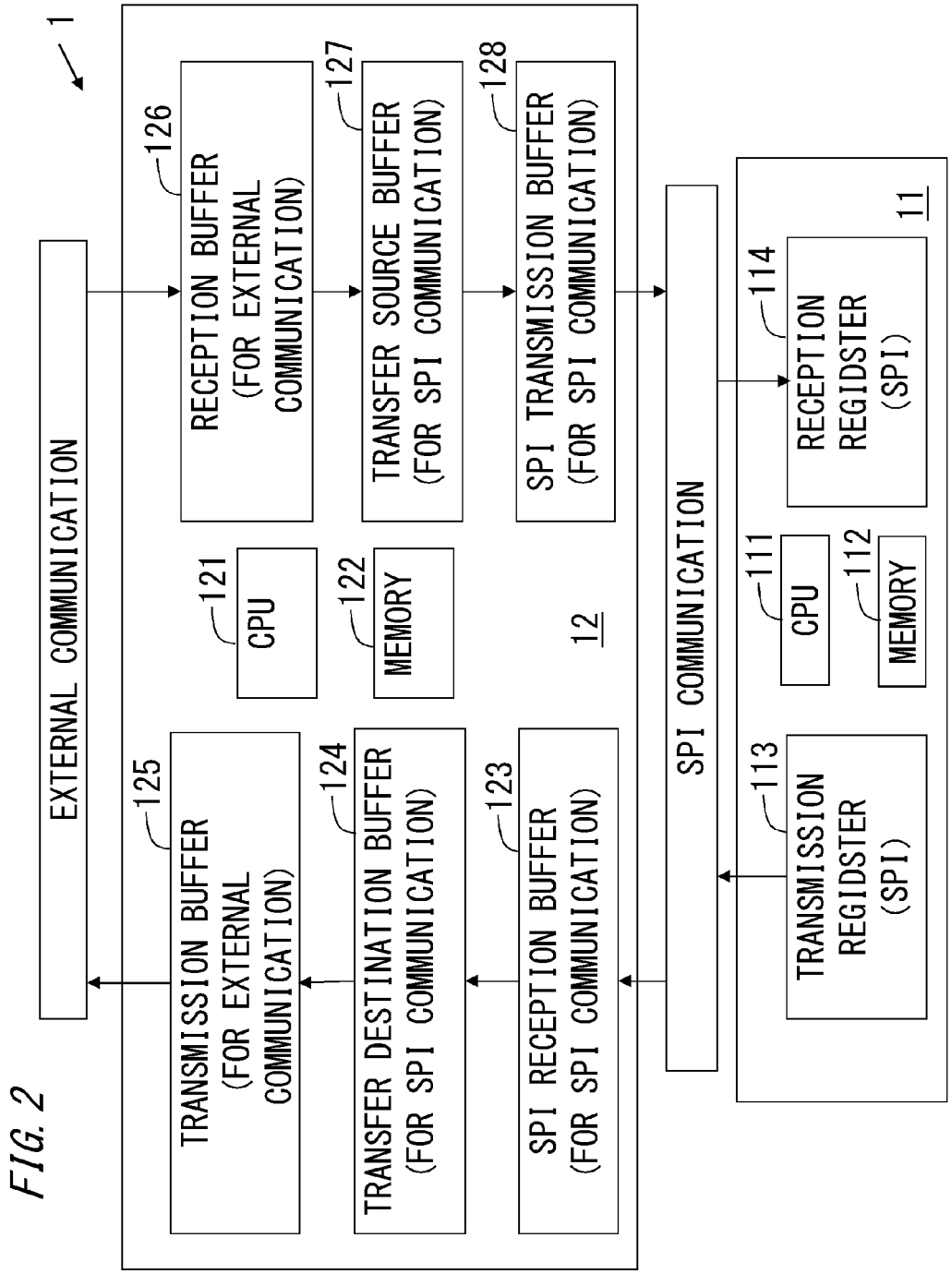
FIG. 2 is a diagram illustrating a detailed configuration of a communication control apparatus according to an embodiment.

FIG. 2 is a diagram illustrating a detailed configuration of a communication control apparatus 1 according to the embodiment. A host MC 11 includes a CPU 111, a memory 112, a transmission register 113, and a reception register 114. Note that the host MC 11 may further include an input/output (I/O) interface and equivalents for connecting the CPU 111 to an external device. The CPU 111 of the host MC 11 executes a computer program deployed in an executable manner on the memory 112, and thereby operates as the communication control apparatus 1. The memory 112 stores the computer program to be executed by the CPU 111 and data to be processed by the CPU 111. The host MC 11 performs communications of data exemplified by authentication data necessary for charging and data indicating a charging status with an operation target apparatus 2 via a communication IC 12, thus charging a battery mounted in an EV (Electric Vehicle) with electric power of a charging equipment.

In the embodiment, the host MC 11 is connected to the communication IC 12 through Serial Peripheral Interface (SPI) communications, thereby controlling the communication IC 12, Incidentally, it does not mean that the connection between the host MC 11 and the communication IC 12 is limited to the connection based on the SPI communications. For instance, the connection between the host MC 11 and the communication IC 12 may be established by an Inter-Integrated Circuit 12C and other interfaces.

The communication IC 12 according to the embodiment includes a CPU 121, a memory 122, an SPI reception buffer 123, a transfer destination buffer 124, a transmission buffer 125, a reception buffer 126, a transfer source buffer 127, and an SPI transmission buffer 128. The CPU 121 of the communication IC 12 performs the SPI communications with the host MC 11 by a computer program exemplified by firmware and software deployed in the executable manner on the memory 122. The memory 122 stores the computer program to be executed by the CPU 121 and the data to be processed by the CPU 121. To be specific, the communication IC 12 receives a command or data through the SPI communications from the host MC 11, and executes processes based on the computer program exemplified by the firmware and the software in accordance with the command given from the host MC 11.

For example, the communication IC 12 transmits the data coming from the host MC 11 to the operation target apparatus 2 through external communications in accordance with the command given from the host MC 11. The communication IC 12 transfers the data received from the operation target apparatus 2 through the external communications to the host MC 11 through the SPI communications.

The SPI reception buffer 123 and the transfer destination buffer 124 may be said to be buffers for the SPI communications. The transmission buffer 125 may be said to be a buffer for the external communications. Similarly, the reception buffer 126 may also be said to be a buffer for the external communications. The transfer source buffer 127 and the SPI transmission buffer 128 may further be said to be buffers for the SPI communications. It does not, however, mean that the configuration of the communication IC 12 is limited to what is illustrated in FIG. 2. For instance, the transfer destination buffer 124 and the transmission buffer 125 may be a same single buffer. The reception buffer 126 and the transfer source buffer 127 may also be a same single buffer.

In a processing example according to the embodiment, the communication IC 12 temporarily receives the reception data from the host MC 11 by the SPI reception buffer 123, and transfers the received data to the transfer destination buffer 124. Here at, the communication IC 12 erases, from the SPI reception buffer 123, the data transferred to the transfer destination buffer 124. The communication IC 12 transfers the data of the transfer destination buffer 124 to the transmission buffer 125, and transmits the data to the operation target apparatus 2 through the external communications. The communication IC 12 retains the data received from the operation target apparatus 2 through the external communications temporarily in the reception buffer 126. The communication IC 12 transfers the data retained in the reception buffer 126 to the transfer source buffer 127, and further transfers the data to the SPI transmission buffer 128. The communication IC 12 transfers the data of the SPI transmission buffer 128 to the host MC 11 through the SPI communications.

The communication IC 12 according to the embodiment does not, however, a mechanism such as Checksum and Cyclic Redundancy Check (CRC) to determine a degree of certainty of the communication data when performing the SPI communications. The communication IC 12 is thereby unable to determine abnormality due to a communication error and equivalents as exemplified by a bit misalignment and fragmentation of a communication frames when conducting the SPI communications with the host MC 11.

The communication IC 12 is configured to, when an abnormal state caused by the communication error and equivalents continues, self-detect a congestion in a queueing process of the SPI communications due to timeout of a timer, i.e., by the CPU 121 of the communication IC 12 or an unillustrated abnormality detection circuit mounted in the communication IC 12, and conduct a hardware reset. Note that the abnormal state disables the communication IC 12 from performing the data transfer to the transfer destination buffer 124 from the SPI reception buffer 123, the data transfer to the transmission buffer 125 from the transfer destination buffer 124, and the external communications to the operation target apparatus 2 from the transmission buffer 125. In other words, the abnormal state gets the communication IC 12 into a congested status in a queueing process of the SPI communications, in which the communication IC 12 is unable to continue the transmission processes including these data transfers and the external communications. The computer program exemplified by the firmware and software deployed in the executable manner on the memory 122 is temporarily cleared by the hardware reset. Accordingly, after the hardware reset, the communication IC 12 deploys again the computer program in an executable manner on the memory 122. Hence, for example, when the abnormality occurs due to the communication error and the equivalents during the charging operation at the charging stand, the abnormality might lead to such a situation as to stop the charging system including the communication control apparatus 1 in excess of allowed time for which a user is able to stand by.

COMPARATIVE EXAMPLE

Figure 3:
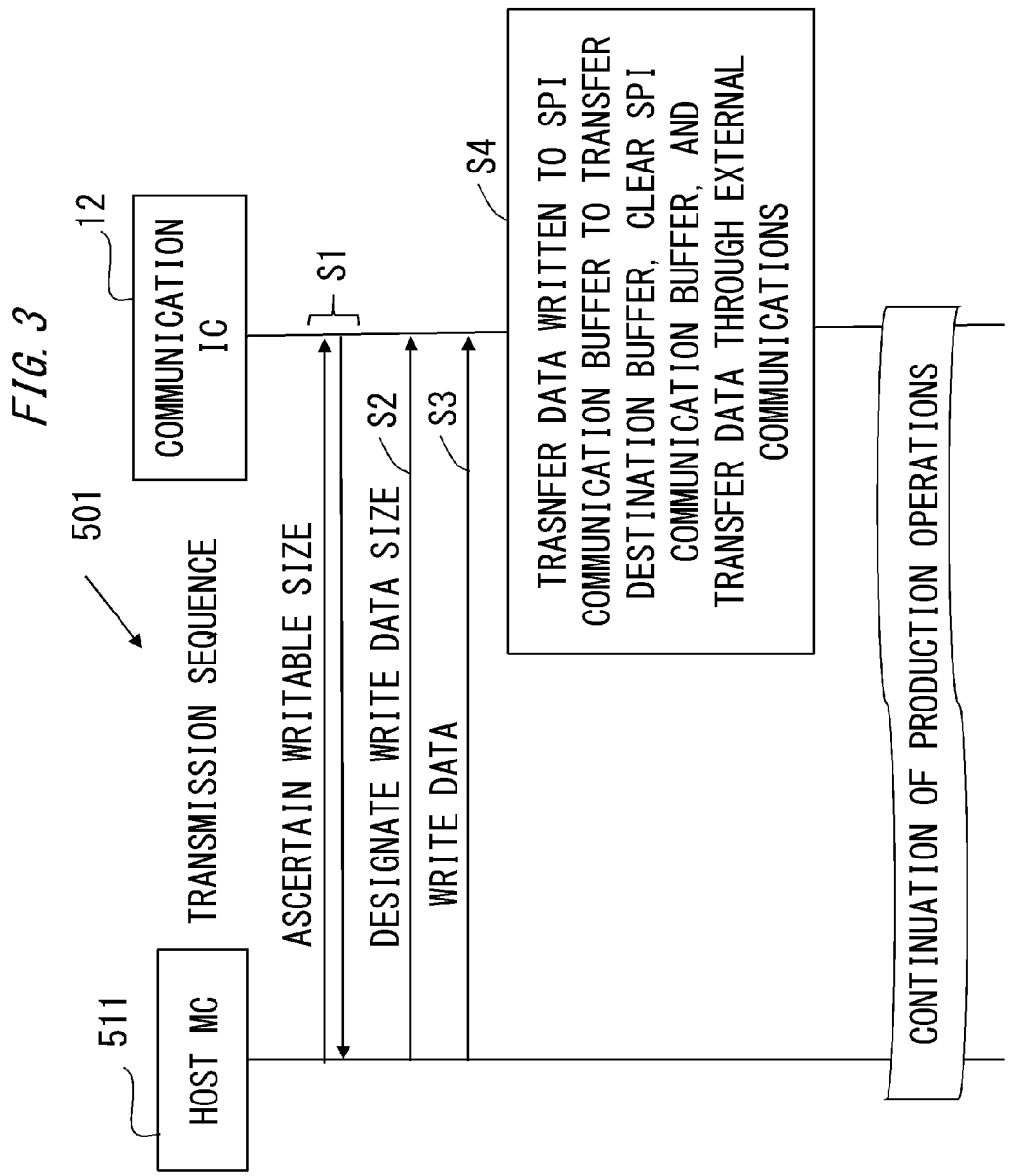
FIG. 3 is a sequence chart illustrating a data transmission sequence when in a normal operation with no communication error.
Figure 4:
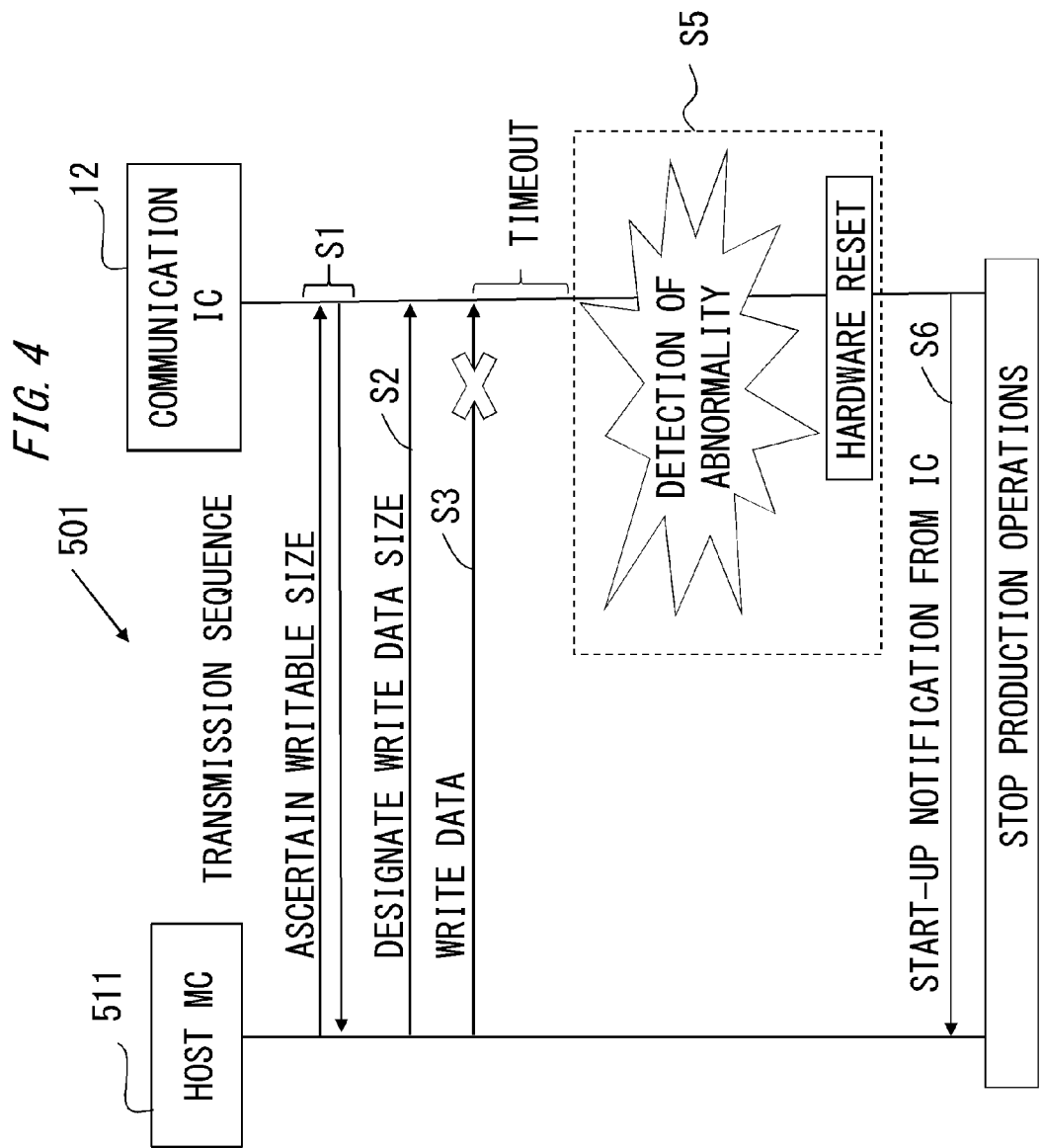
FIG. 4 is a sequence chart illustrating a data transmission sequence when in an abnormal state due to the communication error in a comparative example.

To start with, FIGS. 3 and 4 illustrate processes of the communication control apparatus 501 according to a comparative example. FIG. 3 is a sequence chart illustrating a data transmission sequence when in a normal operation with no communication error. A communication control apparatus 501 includes a host MC 511 and the communication IC 12.

In this process, the host MC 511 ascertains a writable size for checking a free space of the SPI reception buffer 123 of the communication IC 12 (S1). The host MC 511 transmits an acknowledgement command for ascertaining the writable size defined as the free space of the SPI reception buffer 123 to the communication IC 12, and obtains the free space as a response thereof in this process.

Next, the host MC 511 checks whether a write data size of this time is smaller than the free space (writable size) of the SPI reception buffer 123 of the communication IC 12. When the write data size of this time is smaller than the free space (writable size) of the SPI reception buffer 123 of the communication IC 12, the host MC 511 designates the write data size in the communication IC 12 (S2). The host MC 511 then writes the data to the communication IC 12 (S3). The host MC 511 normally writes the data, in which case the communication IC 12 transfers the data written to the SPI reception buffer 123 to the transfer destination buffer 124 for the external communications, and erases the transferred data from the SPI reception buffer 123. In other words, the communication IC 12 clears the SPI reception buffer 123, and transfers the data in the transfer destination buffer 124 to the operation target apparatus 2 through the external communications (S4). Thereafter, the communication control apparatus 501 continues product-related operations. For example, the EV is charged with the electric power at the charging stand. It is noted that the communication IC 12 may further transfer the data in the transfer destination buffer 124 to the transmission buffer 125 by the process of S4, and then transfer the data to the operation target device 2 by the external communications.

As described above, the SPI reception buffer 123 may be said to be a reception buffer in the SPI communications of the communication IC 12. The process in S4 includes storing the received data in the reception buffer (SPI reception buffer 123), transferring the received data to the transfer destination buffer 124 from the reception buffer (SPI reception buffer 123), and erasing the transferred data from the reception buffer (SPI reception buffer 123). In other words, the process in S4 may be said to be one example of a data processing function.

FIG. 4 is a sequence chart illustrating a data transmission sequence when in an abnormal state due to the communication error in the comparative example. The processes in S1 through S3 in FIG. 4 are the same as those in FIG. 3. In FIG. 4, however, the abnormality occurs in the data write by way of the data transfer to the communication IC 12 from the host MC 511. For instance, the abnormality is exemplified such that the data do not correctly arrive at the communication IC 12 because of noises entering an SPI communication line. Here at, the communication IC 12 determines that a data count is less than the set write data size, and waits till reaching the set write data size. Even when a predetermined period of time elapses, however, the transmitted data count is less than the set write data size, in which case the communication IC 12 detects the abnormality. For example, a predetermined timer is timed out, whereby the communication IC 12 may detect the abnormality. Subsequently, the communication IC 12 executes the hardware reset (S5). The transfer to the transfer destination buffer 124 from the SPI reception buffer 123 is interrupted by the process in S5. Therefore, the process in S5 may be said to be one example of an abnormality processing function of interrupting the transfer. The communication IC 12 may also be said to be one example of a first controller having the data processing function and the abnormality processing function.

The communication IC 12 having conducted the hardware reset restarts and makes a start-up notification to the host MC 511 (S6). However, with the hardware reset being done, it follows that the program exemplified by the firmware on the memory 122 in the communication IC 12 is cleared, and the communication IC 12 gets restarted. With the communication IC 12 getting restarted, it follows that the product-related operations halt for a relatively long period of time. As a result, such a situation arises that a process, e.g., a charging process of the communication control apparatus 501 is disabled from being executed for a predetermined period of time or longer.

<Embodiment 1> (Processing Procedures)

Figure 5:
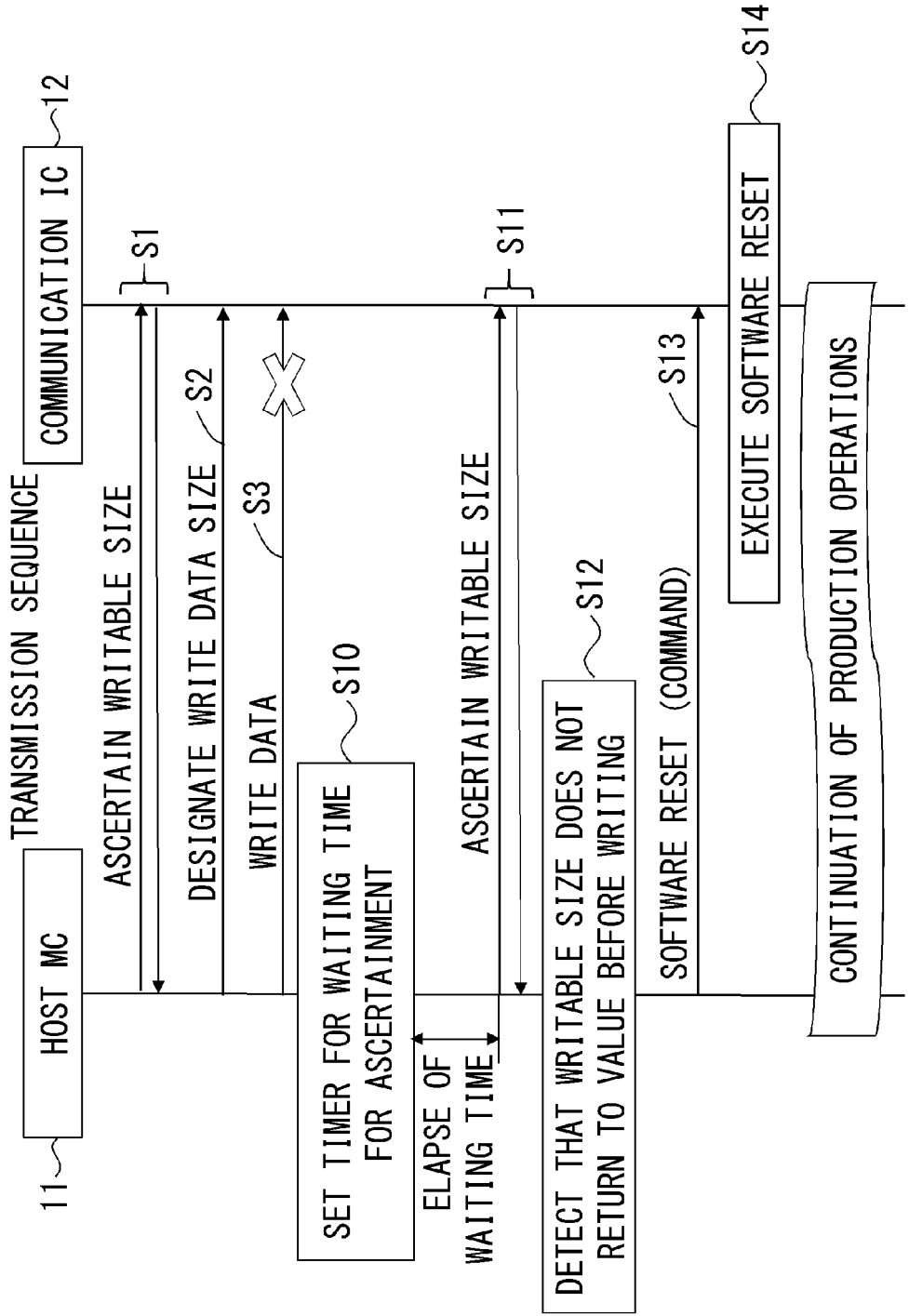
FIG. 5 is a sequence chart illustrating a data transmission sequence in which the communication control apparatus according to the embodiment detects an occurrence of the communication error and handles the detected communication error.

Processes of the communication control apparatus 1 according to an embodiment 1 will hereinafter be exemplified with reference to FIGS. 5 and 6. FIG. 5 is a sequence chart illustrating a data transmission sequence of how the communication control apparatus 1 according to the embodiment 1 handles a detected communication error upon detecting an occurrence of the communication error. In FIG. 5, processes in S1 through S3 are the same as the processes in FIGS. 3 and 4. The host MC 11 may be said to be one example of a second controller to transmit data or a command to the communication IC 12 defined as a communication apparatus.

Such a case is assumed also in the embodiment 1 that the abnormality occurs in the data write (S3) to the communication IC 12 from the host MC 11. For instance, the processing is interrupted upon detecting the abnormality due to the timeout and equivalents in the data reception process of the communication IC 12. In the processes of FIG. 5, however, the host MC 11 detects the abnormality on the side of the host MC 11 in the following procedures before detecting the abnormality in the communication IC 12. To be specific, at first, the host MC 11 sets a timer for measuring a period of waiting time for ascertainment (S10) after the data write (S3). This period of waiting time is set to a period of time that is by far shorter than a period of time (timeout period) till the abnormality is detected in the communication IC 12 and is longer than a period of time for transferring the data to the transfer destination buffer 124 from the SPI reception buffer 123. Next, after the data write in S3, the host MC 11 again ascertains the writable size to check the free space of the SPI reception buffer 123 of the communication IC 12 (S11). In this process, the host MC 11 transmits, to the communication IC 12, an ascertainment command for ascertaining the writable size defined as the free space of the SPI reception buffer 123, and obtains the free space of the SPI reception buffer 123 by way of a response thereof. The data write in S3 is normally carried out, in which case the data written to the SPI reception buffer 123 are basically transferred to the transfer destination buffer 124 on the order of magnitude in terms of time that is shorter than command transmission/reception time between the host MC 11 and the communication IC 12. Subsequently, the data written to the SPI reception buffer 123 are cleared.

However, such a possibility is undeniable that the data transfer between the SPI reception buffer 123 and the transfer destination buffer 124 requires a longer period of time than presumed. This is because the transfer time depends on specifications of a transmission path between the SPI reception buffer 123 and the transfer destination buffer 124, how much the transmission path is affected by an environment of noises and equivalents, or a data quantity to be transferred. Such being the case, the communication control apparatus 1 according to the embodiment 1 sets the timer in a process of S10, and waits till a predetermined period of time (which will hereinafter be simply termed "waiting time") for the ascertainment elapses. It is therefore preferable that the waiting time is set longer than a period of time required for transferring, e.g., a data quantity of a maximum capacity retainable by the SPI reception buffer 123, i.e., the data quantity of the buffer size to the transfer destination buffer 124 from the SPI reception buffer 123. Note that a capacity of the transfer destination buffer 124 is smaller than a capacity of the SPI reception buffer 123, in which case such periods of time may be taken into consideration as a period of time for splitting the data of the SPI reception buffer 123 into a plurality of subsets and thus transferring the split data to the transfer destination buffer 124 and a period of time for further transferring the split data to the operation target apparatus 2 through the external communications. The waiting time may be set in a way that adds, e.g., a margin to a transmission speed depending on the specifications of the transmission path between the SPI reception buffer 123 and the transfer destination buffer 124.

However, the waiting time may also be set corresponding to a quantity of the data write to the communication IC 12 from the host MC 11 (i.e., the data transmitted from the host MC 11). In other words, the waiting time may be set corresponding to the time required for transferring the transmitted data to the transfer destination buffer 124 from the SPI reception buffer 123. Namely, the host MC 11 recognizes the quantity of the data written to the communication IC 12. Accordingly, the host MC 11 may set the waiting time by reflecting the margin in a period of transfer time obtained from the write data quantity and the transmission speed between the SPI reception buffer 123 and the transfer destination buffer 124.

After the waiting time, the host MC 11 is enabled to determine whether the data write in S3 is done normally by ascertaining the free space, i.e., the writable size of the SPI reception buffer 123. To be specific, the host MC 11 serving as the second controller checks whether the data are saved in the SPI reception buffer 123 as the reception buffer by ascertaining the writable size after transmitting the data to the communication IC 12 as the communication apparatus.

The host MC 11 determines whether the writable size returns to a value before the data write in S3. Namely, the host MC 11 already ascertains the writable size in S1 before writing the data to the communication IC 12 in S3. Subsequently, the host MC 11 again ascertains the writable size in S11 after writing the data to the communication IC 12 in S3. When there is a discrepancy between the writable sizes of the data written to the communication IC 12 before and after writing the data by way of data transmission, the host MC 11 determines that the writable size does not return to the value before the data write. In this case, the host MC 11 recognizes that at least some proportion of the data transmitted to the communication IC 12 in the data write in S3 are saved in the SPI reception buffer 123. In other words, it follows that the process of the transfer to the transfer destination buffer 124 from the SPI reception buffer 123 remains stopped halfway. In the embodiment 1, the host MC 11 waits for the elapse of the waiting time set in the timer in S10, and is thereby enabled to complete the transfer to the transfer destination buffer 124 from the SPI reception buffer 123 more surely. In other words, the host MC 11 is enabled to restrain the writable size in S11 from being ascertained halfway through the transfer process to the transfer destination buffer 124 from the SPI reception buffer 123. As a result, the host MC 11 may reduce a possibility of mis-detecting that the writable size does not return to the value before the data write in S3.

The host MC 11, upon detecting that the writable size does not return to the value before the data write in S3 (S12), transmits a reset command to the communication IC 12 (S13). The reset command is herein defined as a command for causing the communication IC 12 to execute a software reset. The reset command may be said to be one example of the command for getting the software reset to be executed. Specifically, the host MC 11 causes the communication IC 12 to execute the software reset according to the reset command when at least some proportion of the data transmitted for the data write in S3 are saved in the SPI reception buffer 123. Note that the writable size returns to the value before the data write in S3, that is referred to as "the SPI reception buffer 123 gets empty" in the embodiment 1. This implies that the data written to the SPI reception buffer 123 by the data write are transferred to the transfer destination buffer 124, and the data written to the SPI reception buffer 123 are cleared from the SPI reception buffer 123. The processes in S11 through S13 are executable in such a period of time as to ascertain the writable size (S11) and to transmit the command forgetting the software reset executed (S13). The host MC 11 is therefore enabled to make the communication IC 12 execute the software reset by transmitting the reset command to the communication IC 12 before the communication IC 12 performs the hardware reset upon detecting the abnormality due to the timeout and equivalents.

The communication IC 12 executes the software reset upon receiving the command. With the software reset being done, the communication IC 12 halts the process of receiving the data, of which the abnormality is detected, and erases the data received in the process concerned from the SPI reception buffer 123 without clearing the computer program exemplified by the firmware and software deployed in the executable manner on the memory 122. The communication IC 12 is thereby returned to the state before receiving the data write in S3. After the communication IC 12 completes the software reset, the host MC 11 and the communication IC 12 return to the normal state. The communication IC 12 may therefore be said to initialize the data reception process without erasing the computer program stored in the memory 122 owing to the software reset. Then, the host MC 11 executes again the data write in S3, of which the abnormality was detected.

Figure 6:
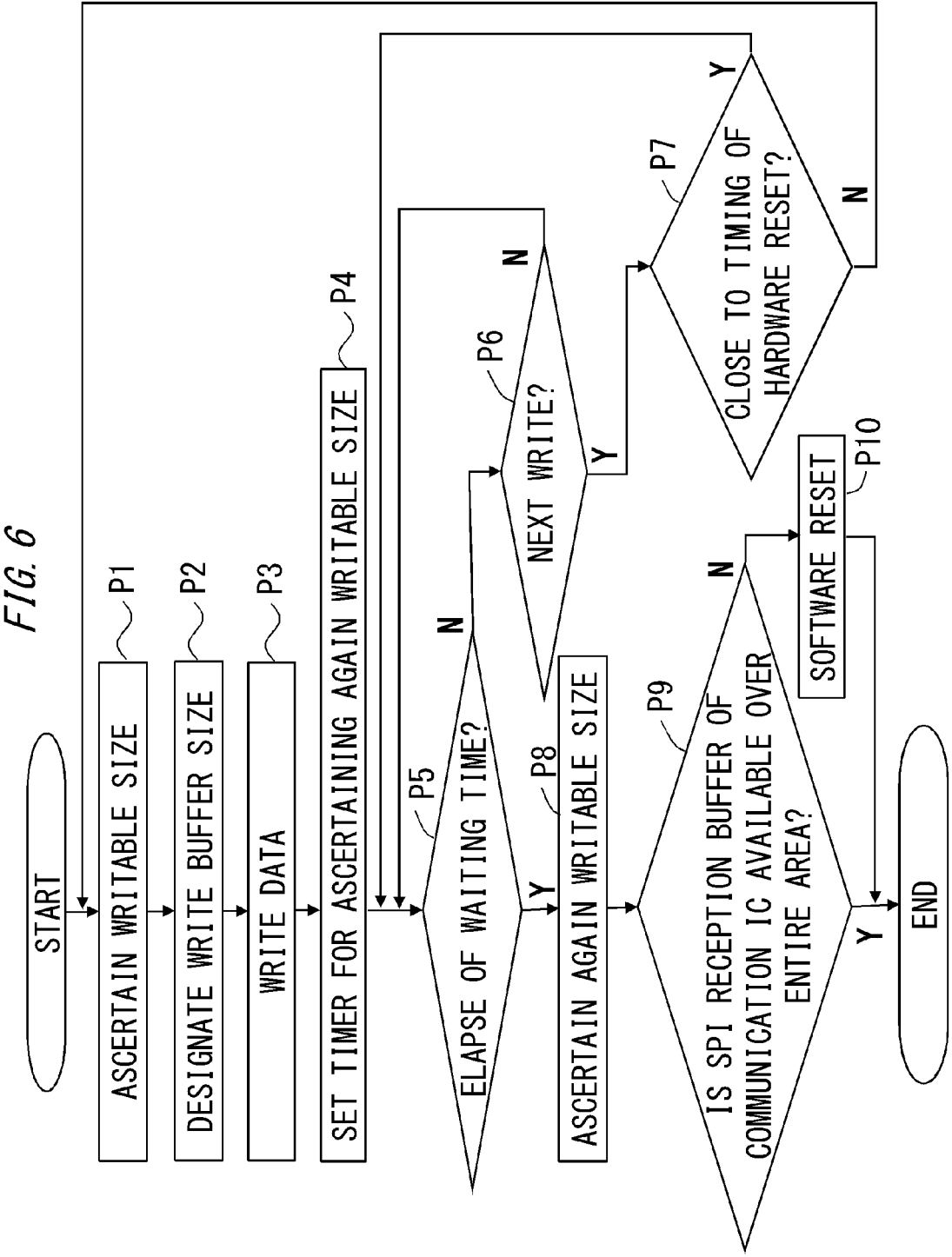
FIG. 6 is a flowchart illustrating processes of a host MC in the embodiment 1.

FIG. 6 is a flowchart illustrating processes of the host MC 11 in the embodiment 1. In these processes, the host MC 11 transmits the command to the communication IC 12, and ascertains the writable size (P1). The host MC 11 designates a write buffer size (which is also referred to as a write data size) that is within the ascertained writable size in the communication IC 12 (P2). The host MC 11 executes writing the data to the communication IC 12 (P3).

The host MC 11 sets the waiting time for re-ascertaining the writable size in the timer (P4). As described above, the waiting time is determined based on the time required for transferring the data of the retainable maximum quantity determined from the buffer sizes of the SPI reception buffer 123 and the transfer destination buffer 124. The waiting time may be set corresponding to a quantity of the data write to the communication IC 12 from the host MC 11.

The host MC 11 determines whether the waiting time elapses, i.e., whether there is a passage of the waiting time (P5). When the waiting time does not yet elapse (N in P5), the host MC 11 determines whether there exist the data to be transmitted next, i.e., the data to be written to the communication IC 12 next (P6). When there are no data to be written to the communication IC 12 next (N in P6), the host MC 11 loops back the processing to P5. In other words, the host MC 11 stands by for the elapse of the waiting time till timer interrupt occurs. Whereas when there exist the data to be written to the communication IC 12 next (Y in P6), the host MC 11 determines whether the communication IC 12 gets close to timing of the hardware reset (P7). When not getting close to the timing of the hardware reset, the host MC 11 loops back control to P1 and writes the next data to the communication IC 12. Consequently, the process in P4 is further executed, as a result of which a new period of waiting time is set again in the timer. Namely, it follows that the timer re-executes, from an initial status, the process of measuring the waiting time before the elapse of the waiting time defined as a predetermined period of time. As a result, there is extended the time till the predetermined period of time which is the waiting time elapses.

On the other hand, as discussed above, a received data count is less than the set write data size even when the time defined as a predetermined limit up to the timeout in the communication IC 12 elapses, in which case the communication IC 12 detects the abnormality. Consequently, the communication IC 12 executes the hardware reset. Accordingly, when the waiting time elapses in excess of the predetermined limit after the data write in the process of P3, the communication IC 12 carries out the hardware reset before the software reset. Therefore, when such a possibility exists that the waiting time elapses in excess of the predetermined limit after the data write in the process of P3 (Y in P7), the host MC 11 avoids the extension of the waiting time. To be specific, the waiting time is extended as a result of writing the next data, and there is the possibility that the waiting time elapses in excess of the predetermined limit (Y in P7), in which case the host MC 11 loops back the control not to P1 but to P5.

As a consequence, the host MC 11 sands by till the present waiting time elapses. This is because the elapse of the waiting time in excess of the predetermined limit leads to a possibility that the time up to the transmission of the reset command for getting the software reset executed delays in excess of the predetermined limit. The specifications (e.g., the period of the timeout of the communication IC 12) of the communication IC 12 determine how long the predetermined limit is set. Note that the host MC 11 makes the determination in P7 about the earliest set of data among the plural sets of data when not yet confirming that the SPI reception buffer 123 already gets empty. Namely, the host MC 11 may simply determine whether the waiting time elapses in excess of the predetermined limit with respect to the data being written earliest among the plural sets of data not yet having the confirmation that SPI reception buffer 123 becomes empty.

When the waiting time elapses (Y in P5), the host MC 11 transmits the command to the communication IC 12, and ascertains again the writable size (P8). The host MC 11 determines whether the SPI reception buffer 123 is empty, in other words, whether the communication IC 12 is available over the entire area, i.e., whether the writable size returns to the value before the data write in P3 (P9). When the writable size returns to the value before the data write in P3, the host MC 11 finishes the data write process. Note that when once confirming that the SPI reception buffer 123 is empty in the determination of P9, the host MC 11 is enabled to determine that the plural sets of data not yet having the confirmation are all written to the communication IC 12. Accordingly, at this point of time, there is temporarily cleared the waiting time for the determination in P7, i.e., the waiting time for determining whether there is the possibility that the waiting time elapses in excess of the predetermined limit.

In the determination in P9, whereas when the writable size does not return to the value before the data write in P3, the host MC 11 transmits the command for getting the software reset executed to the communication IC 12 (P10). Then the host MC 11 finishes the processing. After completing the software reset in the communication IC 12, the host MC 11 executes again the data write process.

Effects of Embodiment 1

As stated above, in the communication control apparatus 1 according to the embodiment 1, the host MC 11, after writing the data to the communication IC 12, determines whether the SPI reception buffer 123 is empty, i.e., whether the writable size returns to the value before the data write in P3 of FIG. 6. This determination enables the host MC 11 to determine whether the communication IC 12 normally receives the data and whether the data written to the SPI reception buffer 123 are transferred to the transfer destination buffer 124.

In the embodiment 1, however, the host MC 11 stands by for the elapse of the waiting time with the aid of the timer before determining whether the writable size returns to the value before the data write in P3 of FIG. 6. Namely, the host MC 11 makes the determination after the elapse of the waiting time. The waiting time is determined based on the time required for transferring the retainable maximum data quantity determined from the buffer sizes of the SPI reception buffer 123 and the transfer destination buffer 124 to the transfer destination buffer 124 from the SPI reception buffer 123. The waiting time may also be set corresponding to the quantity of the data written to the communication IC 12 from the host MC 11. The host MC 11 is therefore enabled to wait more surely till completing the process of transferring the data written to the SPI reception buffer 123 to the transfer destination buffer 124 and thus erasing the data from the SPI reception buffer 123. As a result, it is feasible for the host MC 11 to restrain an erroneous determination that the data written to the SPI reception buffer 123 are saved before the data written to the SPI reception buffer 123 are transferred to the transfer destination buffer 124.

In the embodiment 1, when there are the data to be next written to the communication IC 12 before the waiting time elapses in P5 of FIG. 6, the host MC 11 set again new waiting time in the timer along with transmitting the next data. In other words, it follows that the timer executes again, from the initial status, the process of measuring the waiting time before the elapse of the waiting time defined as the predetermined time. As a result, the time up to the elapse of the predetermined time defined as the waiting time is extended. It is therefore feasible for the host MC 11 to transmit the next data without delay and to further restrain the erroneous determination that the data written to the SPI reception buffer 123 are saved including the new data.

However, the time up to the elapse of the predetermined time defined as the waiting time is extended, whereby the host MC 11 does not transfer the next data to the communication IC 12 when the hardware reset is executed in the communication IC 12. The host MC 11 does not extend the waiting time. The host MC 11 is thereby enabled to avoid executing the hardware reset in the communication IC 12 even when the waiting time is extended due to the consecutive data transfers.

When the data written to the SPI reception buffer 123 are not transferred to the transfer destination buffer 124, the host MC 11 determines that the abnormality occurs in the data write to the communication IC 12. The host MC 11 transmits the command for causing the communication IC 12 to execute the software reset. Herein, the case that the data written to the SPI reception buffer 123 are not transferred to the transfer destination buffer 124 is a case in which at least some proportion of the written data are saved in the SPI reception buffer 123. As a result, the occurrence of the abnormality is detected in the communication IC 12, thereby enabling the execution of the hardware reset to be avoided. With the hardware reset being done, the computer program exemplified by the firmware and software on the memory 122 in the communication IC 12 is cleared. Consequently, the communication control apparatus 1 requires a considerable period of time for restoration, resulting in stoppage of a variety of processes to be provided to users. There might be a case in which the stoppage of the processes exceeds a limit of time for which the users can wait. For example, the users might feel that it is difficult for the communication control apparatus 1 to charge the battery with the electric power due to the stoppage of these processes.

In the embodiment 1, however, the host MC 11 detects that the abnormality occurs in the data write, and makes the communication IC 12 perform the software reset. Therefore, for instance, only one data writing process is reset and then re-executed, thereby enabling such a possibility to be enhanced that the communication control apparatus 1 returns to the normal state in a short period of time. The communication control apparatus 1 is also enabled to enhance such a possibility as to make successful the data write that once fails in execution. The communication control apparatus 1 is capable of keeping the original functions to the greatest possible degree. In other words, even the communication control apparatus 1 configured not to be equipped with the mechanism for detecting the communication error is capable of simply handling the communication error and restoring the system functions as early as possible or keeping the system functions to the greatest possible degree. It is therefore feasible to reduce a burden on the user, which the occurrence of the communication error accompanies with.

In the embodiment 1, when the communication IC 12 detects the abnormality, the host MC 11 transmits to the communication IC 12 the reset command for causing the communication IC 12 to execute the software reset before performing the hardware reset. Hence, it is feasible to avoid such an event that the communication IC 12 detects the occurrence of the abnormality and executes the hardware reset.

In the embodiment 1, the writable size of the data to the communication IC 12 is obtained before and after writing, i.e., transmitting the data to the communication IC 12 from the host MC 11. When there is the discrepancy between the writable sizes before and after writing, i.e., transmitting the data, the host MC 11 determines that at least some proportion of the written data are saved, i.e., that the abnormality occurs in the data write. Accordingly, the occurrence of the abnormality is surely easily grasped before and after writing, i.e., transmitting the data.

Embodiment 2

A communication control apparatus 1 according to an embodiment 2 will hereinafter be described with reference to FIG. 7. In the embodiment 1, the host MC 11 writes the next data to the communication IC 12 when the waiting time does not yet elapse (N in P5) and when the next data are writable (Y in P6 but N in P7). Here at, the waiting time for ascertaining again the writable size is set again in the timer (P4). Accordingly, the timer again executes measuring the time from the initial status on the basis of the new waiting time, thereby extending the waiting time. It does not, however, mean that the processes of the host MC 11 are limited to the processes described above. The embodiment 2 will exemplify other processes of how the waiting time is set again in the timer. Note that the processes and the configuration of the communication control apparatus 1 are the same as those in the embodiment 1 other than the processes of setting again the waiting time in the timer. This being the case, the processes and the configuration in the embodiment 1 other than the processes of setting again the waiting time in the timer will be applied as they are, and the repetitive descriptions thereof are omitted.

Figure 7:
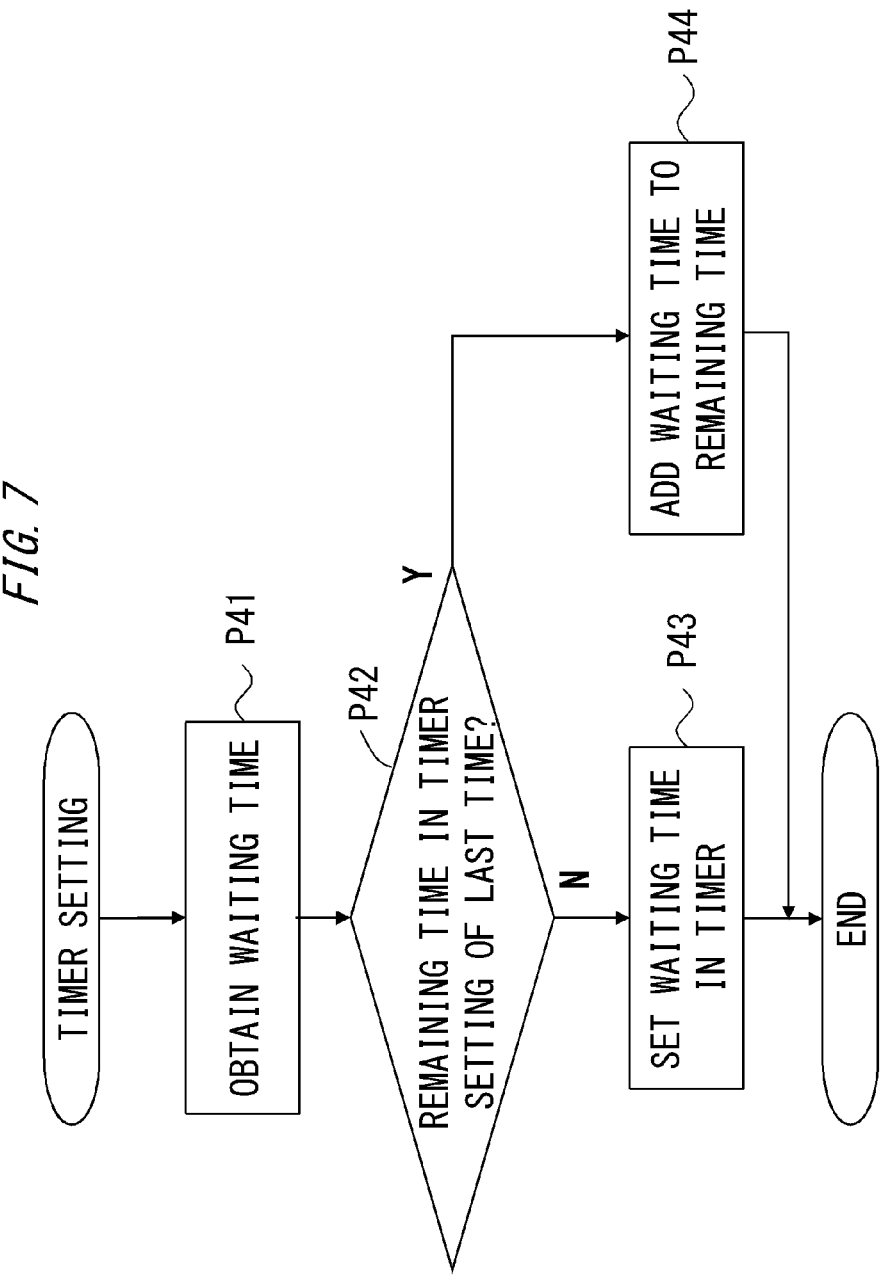
FIG. 7 is a flowchart illustrating processes of timer setting according to an embodiment 2.

FIG. 7 is a flowchart illustrating other processes of the timer setting process (the process in P4 of FIG. 6). In these processes, the host MC 11 obtains the waiting time (P41). The waiting time is the same as described in the processes of FIGS. 5 and 6 according to the embodiment 1. To be specific, the waiting time is determined based on the time required for transferring the data of the retainable maximum quantity determined from the buffer sizes of the SPI reception buffer 123 and the transfer destination buffer 124 to the transfer destination buffer 124 from the SPI reception buffer 123. The waiting time may also be determined corresponding to the quantity of the data write to the communication IC 12 from the host MC 11.

The host MC 11 obtains, e.g., as a parameter saved in the memory, the time required for transferring the data of the maximum quantity to the transfer destination buffer 124 from the SPI reception buffer 123. The maximum data quantity is determined from, e.g., the buffer sizes of the SPI reception buffer 123 and the transfer destination buffer 124. The time required for the transfer is determined from the maximum data quantity, the specifications of the transmission path between the SPI reception buffer 123 and the transfer destination buffer 124, and margins thereof. However, the host MC 11 may also calculate the waiting time in a way that reflects the margins in the quantity of the data written to the communication IC 12 and in the specifications of the transmission path between the SPI reception buffer 123 and the transfer destination buffer 124.

Next, the host MC 11 determines whether there is remaining time up to the timer interrupt during the time measurement by the timer having accepted the setting of the last time (P42). The host MC 11 is enabled to determine whether the timer is in the process of the measurement, depending on whether the timer which has been set by host MC 11 of the last time already reaches the timer interrupt.

When there is no remaining time (N in P42) due to the occurrence of the timer interrupt in the timer having accepted the setting of the last time, the host MC 11 sets the waiting time obtained in P41 in the timer (P43). As a result, the timer starts measuring the time by using this waiting time. Whereas when the timer does not yet reach the timer interrupt but there is the remaining time (Y in P42), the host MC 11 adds the waiting time obtained in P41 to the remaining time, and thus lets the timer continue to measure the time (P44). Specifically, the host MC 11 reads a present count value of the timer from a corresponding register, calculates the remaining time, and adds the waiting time obtained in P41 to the remaining time, thus obtaining a total period of time. Subsequently, the host MC 11 restarts the timer by using this total time. Note that the host MC 11 may rewrite the remaining time of the timer into the total time during the time measurement by the timer, depending on functions of the timer.

With the above-mentioned processes being done, the host MC 11 stands by for the elapse of the waiting time till the data written to the SPI reception buffer 123 last time are transferred to the transfer destination buffer 124, and the data written to the SPI reception buffer 123 this time are transferred to the transfer destination buffer 124. In other words, the host MC 11 is enabled to stand by till reaching the surer timing when plural sets of data are transferred. Namely, it is feasible to avoid the erroneous determination that the data written to the communication IC 12 are still left in the SPI reception buffer 123 more surely than by the processes according to the embodiment 1. The communication control apparatus 1 is therefore enabled to further reduce the possibility of mis-detecting the communication error.

Embodiment 3

A communication control apparatus 1 according to an embodiment 3 will hereinafter be described with reference to FIGS. 8 and 9. In the embodiments 1, and 2, the host MC 11 sets the timer after writing the data to the communication IC 12 but before ascertaining the writable size, and stands by for the elapse of the waiting time. In the embodiment 3, the host MC 11 ascertains the writable size a plural number of times after writing the data to the communication IC 12. With the plurality of ascertainments, the host MC 11 restrains the erroneous determination that the data written to the SPI reception buffer 123 are saved in the same way as in the embodiments 1 and 2. Note that a predetermined number of times is set to such a number of times as to complete the ascertainment of the writable size within a period of time for which the communication IC 12 is hardware-reset due to the abnormality after the host MC 11 writes the data to the communication IC 12. For example, it is sufficient that the predetermined number of times is such a number of times as to enable the ascertainment of the writable size to be made the predetermined number of times within the time equivalent to the waiting time set in the timer as described in the embodiment 1.

For instance, the writable size might not return to the value before the data write to the communication IC 12 at the first ascertainment of the writable size. However, the host MC 11 repeats the ascertainment of the writable size afterward, whereby the data of the SPI reception buffer 123 are transferred to the transfer destination buffer 124 and the writable size might return to the value before the data write to the communication IC 12. In the communication control apparatus 1 according to the embodiment 3, the configuration and the processes other than the process in which the host MC 11 ascertains the writable size the predetermined number of times without standing by for the elapse of the waiting time, are the same as those in the embodiment 1. This being the case, the processes and the configuration in the embodiment 1 other than the timer setting in P4 and the determination of the elapse of the waiting time in P5 of FIG. 6 will be applied to the embodiment 3 as they are, and the repetitive descriptions thereof are omitted.

(Processing Procedures)

Figure 8:
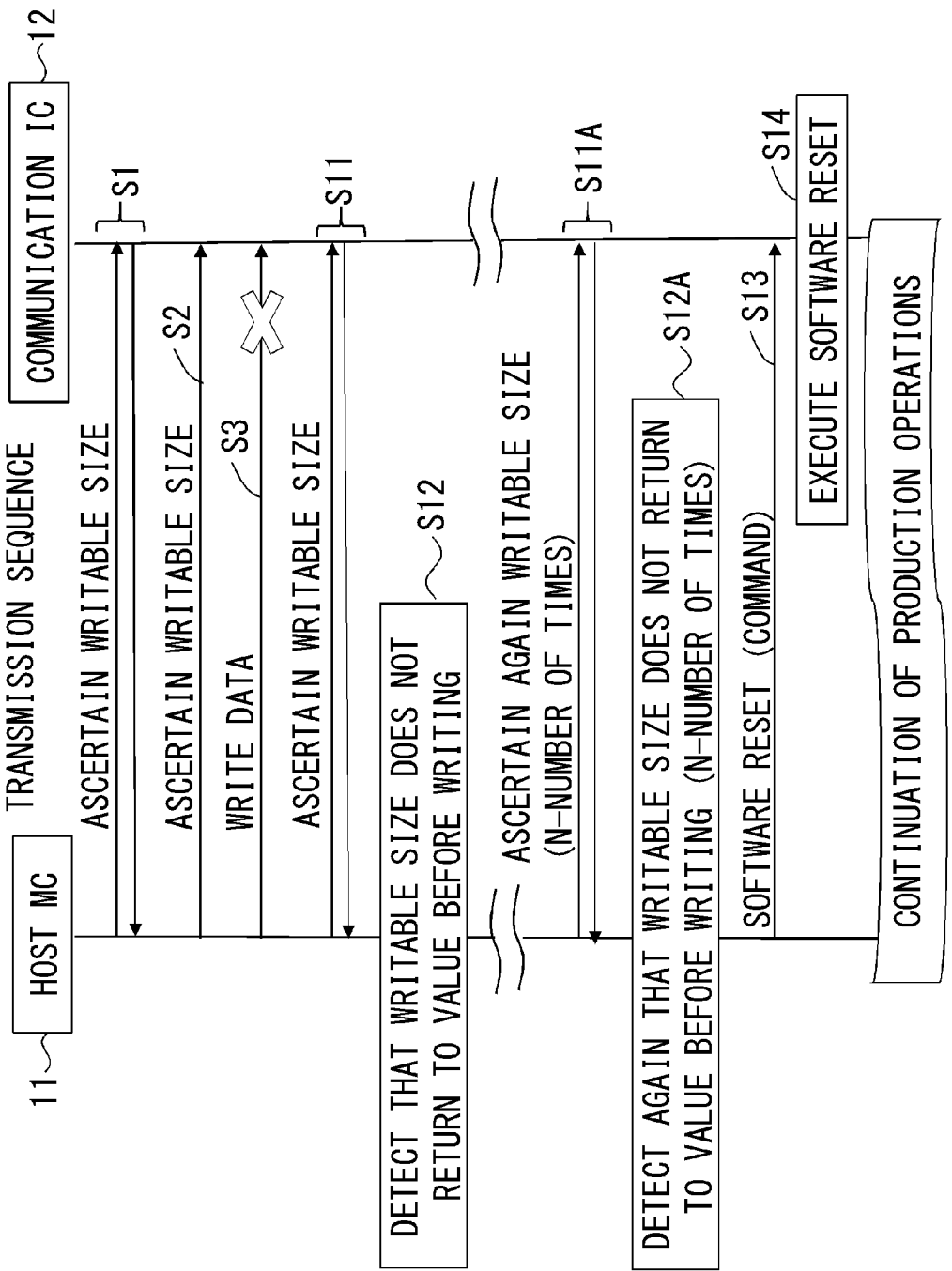
FIG. 8 is a sequence chart illustrating a data transmission sequence of how the communication control apparatus according to an embodiment 3 detects the occurrence of the communication error and handles the detected communication error.

FIG. 8 is a sequence chart illustrating a data transmission sequence of how the communication control apparatus 1 according to the embodiment 3 detects the occurrence of the communication error and handles the detected communication error. In FIG. 8, the processes in S1 through S3 are the same as those in FIGS. 3 and 4.

The embodiment 3 also assumes the case in which the abnormality occurs in the data write to the communication IC 12 from the host MC 11 (S3). For example, in the data reception process of the communication IC 12, the abnormality due to the timeout and equivalents is detected to thereby interrupt the processing. In the embodiment 3 also, the host MC 11 detects the abnormality in the following procedures before detecting the abnormality in the communication IC 12. To be specific, the host MC 11, after the data write in S3, ascertains the writable size to check the free space of the SPI reception buffer 123 of the communication IC 12 (S11).

Subsequently, the host MC 11 determines whether the writable size returns to the value before the data write in S3 (S12). When detecting that the writable size does not return to the value before the data write in S3, the host MC 11 repeats the process till confirming the detection the predetermined number of times. Namely, the host MC 11 ascertains the writable size the predetermined number of times, and detects the predetermined number of times that the writable size does not return to the value before the data write in S3 (S11A, S12A). Subsequently, the host MC 11 detects the predetermined number of times (a plural number of times, an N-number of times) that the writable size does not return to the value before the data write in S3. After making the detection the predetermined number of times, the host MC 11 transmits the reset command for getting the software reset executed to the communication IC 12 (S13). The communication IC 12 executes the software reset by this command (S14).

FIG. 9 is a flowchart illustrating the processes of the host MC 11 according to the embodiment 3. In FIG. 9, the processes in P1 through P3 are the same as those in FIG. 6, and the repetitive explanations thereof are omitted. The host MC 11, after the data write to the communication IC 12 (P3), transmits the command to the communication IC 12, and ascertains again the writable size (P10). Subsequently, the host MC 11 determines whether the SPI reception buffer 123 is empty, i.e., whether the writable size returns to the value before the data write in S3 (P11). Note that the determination in P11 may be said to be a determination about whether the SPI reception buffer 123 of the communication IC 12 is available over the entire area.

When the writable size returns to the value before the data write in S3 (Y in P11), the host MC 11 finishes the processing. Whereas when the writable size does not return to the value before the data write in S3 (N in P11), the host MC 11 determines whether the confirmation is already made the N-number of times. To be specific, the host MC 11 determines whether such a detection is confirmed the N-number of times that the SPI reception buffer 123 is not empty, i.e., that the writable size does not return to the value before the data write in S3 (P12).

When not confirming the N-number of times that the SPI reception buffer 123 is not empty (N in P12), the host MC 11 determines whether there are the data to be transmitted next, i.e., the data to be written to the communication IC 12 next (P13). When there are not the data to be written to the communication IC 12 next (N in P13), the host MC 11 loops back the processing to P10. Specifically, the host MC 11 repeatedly re-ascertains the writable size.

Whereas when there are the data to be written to the communication IC 12 next (Y in P13), the host MC 11 determines whether the communication IC 12 gets close to the timing of the hardware reset (P14). This determination is the same as by the process described in P7 of FIG. 6. In other words, the host MC 11 determines whether the waiting time might elapse in excess of the predetermined limit because of the waiting time being extended as a result of writing the next data. A degree of how long the predetermined limit is set in terms of the time is determined from the specifications (e.g., the timeout period of the communication IC 12) of the communication IC 1. When not yet confirming that the SPI reception buffer 123 already gets empty with respect to the plural sets of data, the determination may simply be made for the data written earliest among the plural sets of data with the confirmation not yet being made. Note that when once confirming in the determination in P11 that the SPI reception buffer 123 is empty, the host MC 11 is enabled to determine that the plural sets of data with the confirmation not yet being made so far are all normally written to the communication IC 12. Accordingly, at this point of time, the waiting time for the determination in P14, i.e., the waiting time in the determination about whether the waiting time might elapse in excess of the predetermined limit, is temporarily cleared.

When not getting close to the timing of the hardware reset (N in P14), the host MC 11 clears the number of confirmations in P12 to "0" (P15). The host MC 11 then loops back the control to P1, and writes the next data to the communication IC 12. As a result, the number of confirmations is cleared to "0" and is thus initialized, and the confirmation from P10 onward is further iterated. For instance, when the SPI reception buffer 123 is not empty, the confirmation thereof is made the N-number of times.

On the other hand, as described above, even when the predetermined time elapses, the received data count is less than the write data size to be set, in which case the communication IC 12 detects the abnormality and executes the hardware reset. Therefore, when the confirmation from P10 onward is repeated in excess of the predetermined limit after writing the data by the process in P3, the communication IC 12 executes the hardware reset before the software reset. Consequently, when the confirmation from P10 onward might be repeated in excess of the predetermined limit after writing the data by the process in P3 (Y in P14), the host MC 11 avoids transferring the next data and further making the next N-number of confirmations. Specifically, when the processing might be delayed in excess of the predetermined limit as a result of clearing the number of confirmations in P12 to "0" and writing the next data (Y in P14), the host MC 11 loops back the control not to P1 but to P10. As a result, the host MC 11 completes the N-number of confirmations being underway currently without clearing the number of confirmations in P12.

When confirming the N-number of time that the SPI reception buffer 123 is not empty (Y in P12), the host MC 11 transmits the command for getting the software reset executed to the communication IC 12 (P16). Then, the host MC 11 finishes the processing. After completing the software reset in the communication IC 12, the host MC 11 executes again the data write process.

Effects of Embodiment 3

As discussed above, in the communication control apparatus 1 according to the embodiment 3, the host MC 11 determines whether the SPI reception buffer 123 is empty after the data write to the communication IC 12, i.e., whether the writable size returns to the value before the data write in P3 of FIG. 9. In this determination, when detecting that the SPI reception buffer 123 is not empty, i.e., that the writable size does not return to the value before the data write in P3 of FIG. 9, the host MC 11 confirms that the detection is to be repeated the predetermined number of times (N-number of times).

The host MC 11 is therefore enabled to make the determination more surely about the completion of the process of transferring the data written to the SPI reception buffer 123 to the transfer destination buffer 124 and thus erasing the data from the SPI reception buffer 123. For example, it might happen that the writable size does not return to the value before the data write to the communication IC 12 at the first ascertainment of the writable size. However, the host MC 11 repeats the ascertainment of the writable size afterward, whereby the data of the SPI reception buffer 123 are transferred to the transfer destination buffer 124, and the writable size might return to the value before the data write to the communication IC 12. The host MC 11 is thereby enabled to restrain the erroneous determination that the data written to the SPI reception buffer 123 are saved before transferring the data written to the SPI reception buffer 123 to the transfer destination buffer 124.

In the embodiment 3, when detecting that the writable size does not return to the value before the data write in P3 of FIG. 9, the host MC 11 determines whether the next data are written before repeating the above detection the predetermined number of times (N-number of times). Subsequently, the when transmitting the next data before the detection is repeated the N-number of times, the host MC 11 clears the number of confirmations made so far to "0" (P15 in FIG. 9). As a result, the number of confirmations is initialized to "0", and the confirmation from P10 onward is further repeated. For instance, the SPI reception buffer 123 is not empty, in which case the confirmation is made the N-number of times. It therefore follows that the host MC 11 transmits the next data without any delay and repeats the N-number of times such detection that the next data are to be saved. Accordingly, it is feasible for the host MC 11 to restrain the erroneous determination that the data written to the SPI reception buffer 123 are to be saved including the new data.

However, the time till transmitting the reset command for getting the software reset executed is delayed in excess of the predetermined limit by clearing the number of confirmations to "0" in P15 of FIG. 9, in which case the host MC 11 does not clear the number of confirmations. The host MC 11 does not also transmit the next data. Consequently, the process of clearing the number of confirmations to "0" in P15 of FIG. 9 is repeated with respect to the plural sets of data, thereby enabling the avoidance of the hardware reset being executed upon detecting the abnormality in the communication IC 12.

Other Modified Examples

The embodiments discussed above have exemplified the communication control apparatus 1 by way of one example of the charging system mounted in the EV. It does not, however, mean that the communication control apparatus 1 according to the embodiments is limited to the charging system mounted in the EV. The configuration of the communication control apparatus 1 is applicable to various equipment and electronic device other than the EV. Owing to the configuration of the communication control apparatus 1 according to the embodiments, the system easily detects the communication error and gets easier to avoid the situation led to the hardware reset even when the system does not include, e.g., the mechanism for detecting the error of the communications between the plural ICs on the single board. As a result, it is feasible to early restore the original system functions or to keep these functions to the greatest possible degree.

In the embodiments, the host MC 11 determines whether the writable size returns to the value before the data write in S3 of FIGS. 4, 5 and 8. To be specific, when there is the discrepancy between the writable sizes of the data written to the communication IC 12 before and after writing the data, the host MC 11 determines that the writable size does not return to the value before the data write. Subsequently, the host MC 11 transmits the command for getting the software reset executed to the communication IC 12. It does not, however, mean that the determination of whether the transmission of the command for getting the software reset executed is required, is limited to the process described above. For example, the host MC 11 may also determine whether the transmission of the command for getting the software reset executed is required, depending on whether the writable size obtained in S11 takes the maximum value after writing the data in S3. Herein, a connotation of the writable size taking the maximum value is that the writable size is the buffer size of the SPI reception buffer 123.

For instance, it is assumed that whenever the host MC 11 writes the data to the communication IC 12, the communication IC 12 transfers all of the written data to the transfer destination buffer 124 from the SPI reception buffer 123, thus clearing the SPI reception buffer 123. The communication IC 12 executes the process described above, in which case when the data are written normally, the data are not saved in the SPI reception buffer 123 but are cleared. The host MC 11 may simply determine whether the transmission of the command for the software reset executed is required, depending on whether the writable size obtained in S11 takes the maximum value after writing the data in S3. Herein, the maximum value is defined as the buffer size of the SPI reception buffer 123. The host MC 11 is therefore enabled to easily determine whether the data are normally written to the communication IC 12 and whether the written data are saved in the SPI reception buffer 123. The host MC 11 is thereby enabled to easily determine whether the transmission of the command for getting the software reset executed is required.

What is claimed is:

1. A communication control apparatus comprising:
a communication apparatus including:
   a memory configured to store a program;
   a reception buffer configured to save reception data;
   a transfer destination buffer configured to receive the reception data transferred from the reception buffer; and
   a first controller configured to erase the reception data from the reception buffer when the reception data are transferred to the transfer destination buffer from the reception buffer, and execute a hardware reset of erasing the program and executing an initialization process upon detecting an abnormality; and
a second controller configured to transmit data or a command to the communication apparatus,
the second controller checking, after transmitting the data to the communication apparatus, whether the transmitted data are saved in the reception buffer after an elapse of a predetermined period of time shorter than a period of time from transmitting the data until executing the hardware reset upon occurrence of the abnormality in transferring the data, and transmitting a command for getting a software reset executed to execute another initialization process without erasing the program to the communication apparatus when at least some proportion of the transmitted data are saved in the reception buffer.

2. The communication control apparatus according to claim 1, wherein the second controller transmits the command for getting the software reset executed before executing the hardware reset.

3. The communication control apparatus according to claim 1, wherein the second controller obtains, from the communication apparatus, a writable size of the data to the communication apparatus before transmitting the data, further obtains, from the communication apparatus, a writable size of the data to the communication apparatus after transmitting the data, and determines that at least some proportion of the transmitted data are saved in the reception buffer when there is a discrepancy between the writable sizes of the data to the communication apparatus before and after transmitting the data.

4. The communication control apparatus according to claim 1, wherein the second controller obtains, from the communication apparatus, the writable size of the data to the communication apparatus after transmitting the data, and determines that at least some proportion of the transmitted data are saved in the reception buffer when the obtained writable size does not take a maximum value writable to the communication apparatus.

5. The communication control apparatus according to claim 1, wherein the predetermined period of time is set to a period of time required for transferring the data of a maximum capacity to the transfer destination buffer from the reception buffer.

6. The communication control apparatus according to claim 1, wherein the predetermined period of time is set corresponding to a period of time required for transferring the transmitted data to the transfer destination buffer from the reception buffer.

7. The communication control apparatus according to claim 1, wherein the second controller extends a period of time till the predetermined period of time elapses when transmitting next data before the elapse of the predetermined period of time.

8. The communication control apparatus according to claim 7, wherein the second controller determines whether the predetermined period of time elapses by a process of measuring the predetermined period of time, and extends the period of time till the predetermined period of time elapses by executing again the process of measuring the predetermined period of time before the elapse of the predetermined period of time from an initial state.

9. The communication control apparatus according to claim 7, wherein the second controller determines whether the predetermined period of time elapses by a process of measuring the predetermined period of time, and extends the period of time till the predetermined period of time elapses by executing a process of measuring the time in a way that uses a total period of time obtained by adding the predetermined period of time to remaining time in the process of measuring the predetermined period of time.

10. The communication control apparatus according to claim 7, wherein the second controller does not extend the period of time till the predetermined period of time elapses when a period of time till transmitting the command for the software reset executed is delayed in excess of a predetermined limit defined as the period of time till executing the hardware reset due to the extension of the period of time till the predetermined period of time elapses.

11. A communication control apparatus comprising:
a communication apparatus including:
- a memory configured to store a program;
- a reception buffer configured to save reception data;
- a transfer destination buffer configured to receive the reception data transferred from the reception buffer; and
- a first controller configured to erase the reception data from the reception buffer when the reception data are transferred to the transfer destination buffer from the reception buffer, and execute a hardware reset of erasing the program and executing an initialization process upon detecting an abnormality; and
a second controller configured to transmit data or a command to the communication apparatus, the second controller repeating, a predetermined number of times, a confirmation about whether the transmitted data are saved in the reception buffer during a period of time shorter than a period of time till executing the hardware reset upon the occurrence of the abnormality in transferring the data after transmitting the data to the communication apparatus, and transmitting, to the communication apparatus, a command for getting the software reset executed to execute another initialization process without erasing the program upon confirming repeatedly the predetermined number of times that at least some proportion of the transmitted data are saved in the reception buffer.

12. The communication control apparatus according to claim 11, wherein the second controller, when transmitting next data before repeating the confirmation the predetermined number of times, clears the number of confirmations made so far to "0".

13. The communication control apparatus according to claim 12, wherein when a period of time till transmitting the command for getting the software reset executed is delayed in excess of a predetermined limit defined as the period of time till executing the hardware reset due to clearing the number of confirmation made so far to "0", the number of confirmations made so far is not cleared to "0".

14. A communication method to be carried out between a communication apparatus and a second controller, the communication apparatus including:
- a memory configured to store a program;
- a reception buffer configured to save reception data;
- a transfer destination buffer configured to receive the reception data transferred from the reception buffer; and
- a first controller configured to erase the reception data from the reception buffer when the reception data are transferred to the transfer destination buffer from the reception buffer, and execute a hardware reset of erasing the program and executing an initialization process upon detecting an abnormality; and
- a second controller configured to transmit data or a command to the communication apparatus, the communication method comprising:
- checking by the second controller, after transmitting the data to the communication apparatus, whether the transmitted data are saved in the reception buffer after an elapse of a predetermined period of time shorter than a period of time till executing the hardware reset upon occurrence of the abnormality in transferring data; and
- transmitting by the second controller, a command for getting a software reset executed to execute another initialization process without erasing the program to the communication apparatus when at least some proportion of the transmitted data are saved in the reception buffer.

15. A communication method to be carried out between a communication apparatus and a second controller, the communication apparatus including:
- a memory configured to store a program;
- a reception buffer configured to save reception data;
- a transfer destination buffer configured to receive transfer reception data transferred from the reception buffer; and
- a first controller configured to erase the reception data from the reception buffer when the reception data are transferred to the transfer destination buffer from the reception buffer, and execute a hardware reset of erasing the program and executing an initialization process upon detecting an abnormality; and
- a second controller configured to transmit data or a command to the communication apparatus, the communication method comprising:
repeating by the second controller, a predetermined number of times, a confirmation about whether the transmitted data are saved in the reception buffer during a period of time shorter than a period of time till executing the hardware reset upon the occurrence of the abnormality in transferring the data after transmitting the data to the communication apparatus; and transmitting by the second controller, to the communication apparatus, a command for getting the software reset executed to execute another initialization process without erasing the program upon confirming repeatedly the predetermined number of times that at least some proportion of the transmitted data are saved in the reception buffer.

* * * * *